(12) United States Patent
Illy et al.

(10) Patent No.: US 6,293,518 B1
(45) Date of Patent: Sep. 25, 2001

(54) SHORT LIFT VALVE

(75) Inventors: Alois Illy, Limburgerhof; Heinz-Juergen Ruckert, Grossniedesheim, both of (DE)

(73) Assignee: RSB Aktiengesellschaft, Riankenthal (DE)

( * ) Notice: Subject to any disclaimer, the term of this patent is extended or adjusted under 35 U.S.C. 154(b) by 0 days.

(21) Appl. No.: 09/254,721

(22) PCT Filed: Sep. 5, 1997

(86) PCT No.: PCT/EP97/04822

§ 371 Date: Mar. 12, 1999

§ 102(e) Date: Mar. 12, 1999

(87) PCT Pub. No.: WO98/11368

PCT Pub. Date: Mar. 19, 1998

(30) Foreign Application Priority Data

Sep. 12, 1996 (DE) .............................. 196 37 315
Aug. 2, 1997 (DE) .............................. 197 33 544

(51) Int. Cl.[7] ....................................................... F16K 1/00
(52) U.S. Cl. ............................................ 251/318; 251/333
(58) Field of Search ........................................ 251/318, 333

(56) References Cited

U.S. PATENT DOCUMENTS

| 3,630,224 | 12/1971 | Kalvelage . | |
|---|---|---|---|
| 4,792,119 | * 12/1988 | Illy et al. | 251/333 |
| 5,143,350 | * 9/1992 | Illy et al. | 251/326 |
| 5,150,731 | 9/1992 | Jiro . | |
| 5,178,365 | * 1/1993 | Bartoschek et al. | 251/318 |
| 5,826,856 | * 10/1998 | Ruckert et al. | 251/335.3 |

FOREIGN PATENT DOCUMENTS

| 546 464 | 7/1931 | (DE) . |
|---|---|---|
| 6904122 | 2/1969 | (DE) . |
| 2 048 580 | 12/1971 | (DE) . |
| 2 311 865 | 10/1973 | (DE) . |
| 7617567 | 11/1977 | (DE) . |
| 28 03 883 | 8/1979 | (DE) . |
| 89 09 262 | 8/1989 | (DE) . |
| 39 01 695 | 7/1990 | (DE) . |
| 42 02 364 | 7/1993 | (DE) . |
| 93 09 932 | 9/1993 | (DE) . |
| 0 088 508 | 6/1987 | (EP) . |
| 1 359 755 | 7/1974 | (GB) . |

* cited by examiner

Primary Examiner—Kevin Shaver
Assistant Examiner—David A. Bonderer
(74) Attorney, Agent, or Firm—Crowell & Moring LLP

(57) ABSTRACT

An extremely short lift valve comprising a casing with end faces located on a pipeline axis, wherein a separating surface with a valve seat is obliquely fitted in between the end faces of the casing.

20 Claims, 14 Drawing Sheets

SHORT LIFT VALVE

BACKGROUND OF THE INVENTION

The invention relates to a lift valve in accordance with the preamble of claim 1.

In relatively large installations, lift valves are used almost exclusively with a flange casing. In the flange casings, the connection sides of the casings are provided with protruding flange plates which have a sealing face and interact with corresponding counter-flanges located on the pipeline elements to be connected. Sealing elements are arranged between the flanges in the region of the sealing faces, screw elements which penetrate the flange plates producing the necessary prestressing forces for a sealing connection. In order to ensure that the screw elements can be accessed, the flange plates are arranged exposed on the lift-valve casing. The significant advantage of such lift valves with flange elements is also that easy replacement is possible when required. By loosening the screw elements, the lift valve can simply be pulled out between the flanges of the adjacent pipelines and installed between the flanges and sealed again in the same way.

So that installation manufacturers can be equipped with respectively suitable fittings for various applications, there are further casing designs. In the case of sleeve valves, pipeline ends are screwed or soldered into the sleeves. In the case of other valve designs, the connections are designed as welding ends to be welded to associated pipeline ends in a fluid-tight fashion. The effort for the installation and removal of such valves is considerably greater. Owing to the different design series, these various designs require a large logistical outlay both on the part of the manufacturer and on the part of the customer.

GB-A 1 359 755 shows a lift-valve design which is intended to allow costs to be reduced and to involve a reduced material outlay and reduced processing effort as well as a simple design. For this purpose, a valve is proposed in whose tubular casing a cylindrical passage is provided. This passage serves to receive a replaceable cylindrical insert which abuts against a shoulder within the tubular casing. The insert contains flow conducting paths for a fluid which is to be blocked off and a valve seat and requires positioning elements which can be used to align its position within the casing precisely and hold it in this position. In a corresponding way, a cap, in which a replaceable insert, which receives the activation elements of a valve stem, is mounted, is arranged in the outer cylindrical casing of the valve. This solution is suitable both for valve casings which are clamped in between flanges and for casings which are equipped with flange plates. In comparison with a conventional valve, this design is however considerably more expensive since, owing to the casing which is complicated to fabricate, and to the additional insert, the processing outlay is substantially greater than that for cast valve casings. In addition, the material-removing processing of the inserts give rise to serious material losses, and, as a result of the inserts, connection points arise which also have to be sealed and at which corrosion problems may occur under certain circumstances. Furthermore, this valve has a comparatively large overall length. Therefore, long screw bolts are required for the clamping in procedure. Said screw bolts give rise to significant handling disadvantages, since a large amount of space is required to remove and install the valve, and this is not available in many installation situations.

Existing standards define the overall lengths of the lift valves. In principle, a lift valve comprises a casing region, which contains a movably arranged closure element, and has an associated valve seat in a dividing wall. Flange plates are arranged on both sides of this casing region using junctions. A medium flowing linearly to a lift valve through a pipeline is deflected, after passing through the first flange in the junction region, in order to pass a valve seat with associated closure element and be directed from a casing junction region lying opposite in the axial direction again to the continuing pipeline. Such a wave-shaped path through a lift valve with vertically arranged stem inevitably increases the overall length of the valve casing and causes flow losses, for which reason lift valves usually have a high flow coefficient $\xi$. Said coefficient is usually of the order of magnitude of approximately 4.

Different designs have been developed in order to obtain flow coefficients which are more advantageous for lift valves. One of these designs are so-called slanted seat valves, in which the flow path between the connecting flanges is as linear as possible, into which flow path a closure element which is arranged obliquely thereto dips. The disadvantage of such a design is the oblique course of the valve stem. Depending on the installation position, such a lift valve can be less convenient to use, is more difficult to insulate and has a large overall length.

A lift valve with low flow losses, an advantageous $\xi$ value of approximately 1.2 and a shorter overall length is the KSB development BOA-Compact, which has made a shorter overall length possible than is the case with traditional lift valves with a valve stem which is arranged perpendicularly with respect to the pipeline. The flange-type designs available on the market require respectively different design series for the different rated pressure levels. This requires a high logistical outlay on manufacture, storage and mounting.

DE-A 20 48 580 presents a valve design which is resistant to corrosive chemicals and has two different overall lengths. The lift valve is implemented in a mixed design, using standardized semifinished products made of special metals, in order to reduce the high costs of the special materials which are necessary. In this respect, FIG. 1 shows a pure welded design, while FIG. 5 shows a short design of the lift valve in which an external, cast housing made of a cheap material which comprises metal or plastic is used. This external housing is provided with a corrosion-resistant internal housing. In its dimensions, the internal housing corresponds, with its closure part and the functional elements which interact with it, to the corresponding parts of the housing design according to FIG. 1. Thus, given two different designs, the manufacturing costs of the parts which are composed of special metals, can be reduced owing to the relatively large number of identical parts.

A round massive valve cone, which is pressed into an eliptical opening of a valve seat which is arranged obliquely in the housing, is intended, whatever its state of wear, to have a sealed termination at the edge of an elliptical opening which forms the valve seat. A prerequisite of this is a rotatable arrangement of the massive valve cone over its lifting range in order to come to bear against other parts of the seat face of the valve cone in each case.

The short valve design which is shown in FIG. 5 of DE-A-20 48 580 can be used only in conjunction with 4-hole flanges. In the case of relatively large flanges or when it is used in pipeline systems with relatively high pressures, which require flanges with more than 4 screwed holes to be used, the clamping-in design which is shown can no longer be used. This is because the flange screws which are used to hold the armature between two flanges cannot be guided past the housing in the region of the valve stem owing to the reciprocal hole for the round valve cone, said hole being located in the housing and running perpendicularly with respect to the through-flow direction. The overall length of the lift valve in FIG. 5 which has a short effect on first impression, is almost 60% larger than the corresponding nominal diameter.

The invention is based on the problem of developing a lift valve which reduces the aforesaid outlay and has a versatile field of application with low flow losses. The solution of this problem provides for a lift valve in accordance with the invention as described hereinafter. The advantages of this design are manifold.

The entire lift valve is considerably shorter and lighter in weight and therefore permits significantly more convenient mounting. The lift valve can be clamped in in an extremely simple way between the flanges of pipelines to be connected. The flanges which are normally provided on the casings of lift valves for connecting to counter-flanges of a pipeline are no longer required for installation purposes. Those casing components which produce a connection to the valve seat region and the flanges are also dispensed with. Instead, only sealing faces are arranged on the casing which only surrounds the closure element. Said sealing faces, which are also known as sealing strips when seals are used, are integrated directly into the casing component which surrounds the closure element and its travel region. The end sides of the casing form at the same time the sealing faces for pipeline elements which are to be connected to the lift valve. The sealing faces thus lie in the direct vicinity of the closure element, as a result of which it is possible to obtain for the first time lift valves with an overall length whose order of magnitude lies approximately in the region of the nominal diameter or corresponds to the nominal diameter. In terms of a pipeline system, this results in significant savings in pipeline lengths and the use of material. In comparison with conventional lift valves, overall length reductions of 135 mm to 330 mm are obtained in the nominal diameter range from DN 25 to DN 150. Overall length reductions of 100 mm to 60 mm are obtained in comparison with BOA-Compact lift valves, which are already very short. This measure has a positive effect on the use of our natural resources and, moreover, has the further advantage that the lower overall weight makes mounting significantly easier and reduces transport costs.

The overall length of the lift valve is determined by the position of the valve seat and the thickness of the adjoining casing wall. By arranging the valve seat obliquely with respect to the direction of through-flow and to the valve stem, both conical and planar valve seat geometries are possible. The slanting valve seat can either be arranged in a plane or have a spatial curvature. When a closure element which rests on the valve seat is used, junctions for a supporting face have to be provided between the casing wall and the valve seat. Said junctions then form, in conjunction with the closure element, a dividing wall within the casing. It is also readily possible to provide in such a dividing wall or in the junctions another, for example conical, valve seat which interacts with a correspondingly shaped closure element. The valve seat or a wall face or wall face components holding the valve seat extend, for the purpose of reducing the overall length, as a quasi-diagonal connection between the end faces of the casing. In doing so, the connection intersects the pipeline axis, or runs obliquely with respect to the through-flow direction. A short and direct connection of the end faces of the casing to the valve seat or a casing component containing the valve seat is essential. This makes it possible to displace the end faces of the casing in the direction of the closure element, resulting in a significant reduction in the overall length. In comparison with the closure-element length which is projected onto the pipeline axis and can be measured in the axial direction, the distance which can be measured between the end faces of the casing in the same direction is only 25% to 50% longer. In comparison with the previously known solutions, this constitutes an only slightly larger distance and makes it possible, for the first time, for the lift valve to have an overall length which can be measured between the end faces of the casing and which preferably corresponds to the respective nominal diameter of a size of lift valve. This is determined essentially by the thickness of the casing wall, the length of the valve seat and the size of the junctions between the valve seat and the casing.

The dividing wall, which is otherwise customary in the case of lift valves, is composed here almost exclusively of the valve seat for the closure element and the junctions adjoining the valve seat and leading into the end sides of the casing or into the surrounding casing wall. This short overall length also results in a further significant advantage. The overall length of a lift valve constitutes a considerable cost factor in the construction of buildings. Buildings must have spaces in which central distribution stations are located and from which the pipeline systems located in the building for heating systems and air-conditioning systems, and water supply systems, are controlled. In the spaces of the distribution stations, the distribution lines of the pipeline systems usually extend vertically. Relatively high spaces are necessary in order to be able to install in the vertical distribution lines a corresponding number of the lift valves which are fabricated in the usual standard overall lengths and have good throttling and regulating properties. Using the new and considerably shorter lift valves, it is possible to construct lower storey heights for the distribution stations. As a result, the construction costs can be reduced and the utilization rate of a building can be improved.

In order to obtain a low flow resistance value, the seat cross-section of the lift valve corresponds approximately to the order of magnitude of the connection cross-section of the pipeline, and thus approximately to the nominal diameter. By throttling the valve cross-section in comparison with the pipeline cross-section, shorter overall lengths would also be possible, but this would degrade the flow coefficient $\xi$.

According to a further refinement of the invention, the casing is of annular design. Such a shape is very easy to fabricate and requires a minimum of material. The end sides of the annular casing serve at the same time as casing sealing faces. In principle, the casing comprises an annular region, an obliquely arranged valve seat or an obliquely arranged dividing face containing the valve seat. The latter can be arranged in the annular casing region in a materially joined, frictionally engaging or positively locking fashion. In a region which is located above this, usually referred to as a casing neck, the closure element and the valve stem are arranged.

In accordance with a further refinement of the invention, the casing and the casing neck are of single-component or multicomponent design. In the case of a single-component design, it is possible to insert the closure element into the casing from the casing sealing-face side. A two-component or multicomponent design also permits a different mounting method, for example through an opening for the casing neck.

Further refinements of the invention, according to which a wall which bounds the travel movement of the closure element is designed so as to be concave towards a space receiving the closure element, and a closure-element face which abuts against the concave wall is of convex design, permit a space-saving arrangement of the closure element within the surrounding casing. The bulges in the wall faces provide a further physical clearance. During the normal travel movement for opening the full flow cross-section, the closure element moves from the valve seat into the space. As a result of the bulges, the closure element can migrate further upwards in the space without being impeded by the screw elements bounding the space or by the required wall thickness.

According to a further refinement of the invention, the lift valve is constructed as a wafer-type valve. The lift valve can thus be clamped in, in an extremely simple way and independently of the permitted pressure levels, between the flanges of pipelines which are to be connected. The sealing faces on the flanges use flat seals to interact with the casing end faces located in the direct vicinity of the closure element. And screw elements which connect the flanges to one another press the pipe-line flanges located on each side of the casing against the casing and clamp said casing tightly between them.

For those applications in which such a lift valve is also intended to be used as a termination fitting for terminating a pipeline, the casing can also be designed as a single-flange casing. This makes it possible to form a supporting surface for screw elements which press the valve casing against the end of a pipeline.

In order to ensure the short overall length, flanges or flange components are arranged on the casing in the region between the end faces of the casing, parts thereof being arranged in a plane which intersects the valve seat. In the case of an externally symmetrical casing design, the valve seat is arranged asymmetrically within the casing, which can result in the situation in which a flange or parts of said flange on one side of the casing are located directly in front of the plane of the valve seat, and on the other side of the casing the flanges or flange components are arranged in a plane which intersects to the valve seat. In order to ensure, when mounting such a lift valve as a termination fitting, that the mounting means do not protrude beyond the valve, the flanges or flange components are arranged set back with respect to the end faces of the casing, at least by a measure corresponding to the height of a screw head or a nut.

The lift valve can also be installed in a pipeline system in which clamp elements connect the casing to a pipeline. The end faces of the casing would then also abut directly against the end face of a pipeline and, depending on the mounting system employed, a plurality of clamp elements, or clamp elements designed as joint components, may be used. For this purpose, grooves or projections as supporting surfaces for the clamp elements are arranged on the circumference of the casing in the region of the casing end-faces. Such connecting techniques are frequently found in the field of the food industry.

DE-B-23 11 865 discloses a lift valve which is designed as a diaphragm valve and is composed of a lower casing part which is made up of three components. The division into three was performed in order to obtain cost-effective injection-moulded parts with approximately identical single weight. A center casing component which is provided with a sealing web has spatially extending flange faces against which flange ends abut, with the intermediate connection of a likewise spatially extending toroidal sealing ring, and are connected to the centre casing component by means of tie rods. This valve is operational only when all three parts are combined.

In contrast, one refinement of the invention provides for the end faces of the casing to be designed as interfaces for different connecting adapters for the pipeline. And a further refinement provides for the connection adapters to be equipped on the pipeline side with different connection shapes. These may be flanges, welding ends, sleeves or the like. This solution provides a significant simplification in the use of a lift valve. As a result, it is also possible to retrofit the lift valve into an already existing pipeline system or into a pipeline system with different connection systems. The basic design constitutes a completely operational lift valve which can be installed in an extremely simple, problem-free fashion in the most widespread pipeline systems with flange connections. The flanges which are usually used permit such a lift valve to be clamped in without difficulty. Designing the end faces of the casing, which form the sealing faces, as an interface for the attachment of adapters, provides the enormous advantage that simple adapters can be used to adapt the lift valve to other pipe connection systems, and install it there, without difficulty. The adapters are in the form of simple rotationally symmetrical components and can be mass-produced using casting or material-removing processes, or in some other way. If necessary, they can also be fabricated at short notice on request, so that costly stockholding for such components is not necessary. For a manufacturer and its dealers it is sufficient to have the operational basic valve in stock, so that, if required, they can be adapted for use in a wide variety of applications using the simple adapters.

For the use of the lift valve which forms the basic element, a further refinement of the invention has provision for the casing region which surrounds a closure element to be provided between the end faces of the casing with one or more radially protruding receptacles which have openings and are intended for screw elements. Screw elements which connect the flanges can be pushed through the openings or attached thereto. The individual receptacles can also be in the form of projections or flange eyes, each projection being equipped with one or more openings. Such a measure constitutes a further saving in material and permits a lift valve to be connected to different flange designs. The openings can correspond to the various national and/or international flange standards, for example ANSI, DIN, EN and the like. It is also possible to use the lift valve as a termination fitting.

According to another refinement of the invention, a casing component which is penetrated by the valve stem is provided with receptacles for screw elements. This is usually a casing neck or that region of the lift valve casing into which a closure element is moved during the opening movement. The receptacles can be blind holes which receive screw elements. This refinement is used in those cases in which the screw elements cannot be moved past the casing neck laterally owing to a close arrangement of the flange holes.

Likewise, according to a further refinement of the invention, the casing component which is penetrated by the valve stem is provided with thickened portions of material for the arrangement of the receptacles. Usually, this applies only to receptacles arranged to the side of a valve stem. The bearing surfaces of said receptacles and of receptacles which lie opposite one another and which extend parallel to the flange faces of the pipeline flanges to be connected are at a greater distance from one another than the remaining receptacles.

A further refinement of the invention provides for the valve seat to be arranged almost completely in the dividing plane between the pipeline axis and the region of the flow space remote from the valve stem. The closure element and the space which is necessary for the travel movement of the closure element and into which it dips during the opening movement is then always located within the hole pattern for the openings of the flange screw-connections as well as inside the necessary wall thickness of the casing. In the region between the casing neck and the pipeline axis, the space in which the closure element is received during the opening movement of the lift valve and can thus exert only little influence in the flow coefficient is provided.

With the invention it is possible to fabricate an extremely compact lift valve which is advantageous in terms of flow and which can be connected with its casing to an extremely wide variety of flanges and/or flange standards. Furthermore, it is possible to cover an equally large application range with a smaller number of casing variants.

BRIEF DESCRIPTION OF THE DRAWINGS

The invention is illustrated in the drawings and is described in more detail below, in said drawings.

DETAILED DESCRIPTION OF PREFERRED EMBODIMENTS

Figure 1:
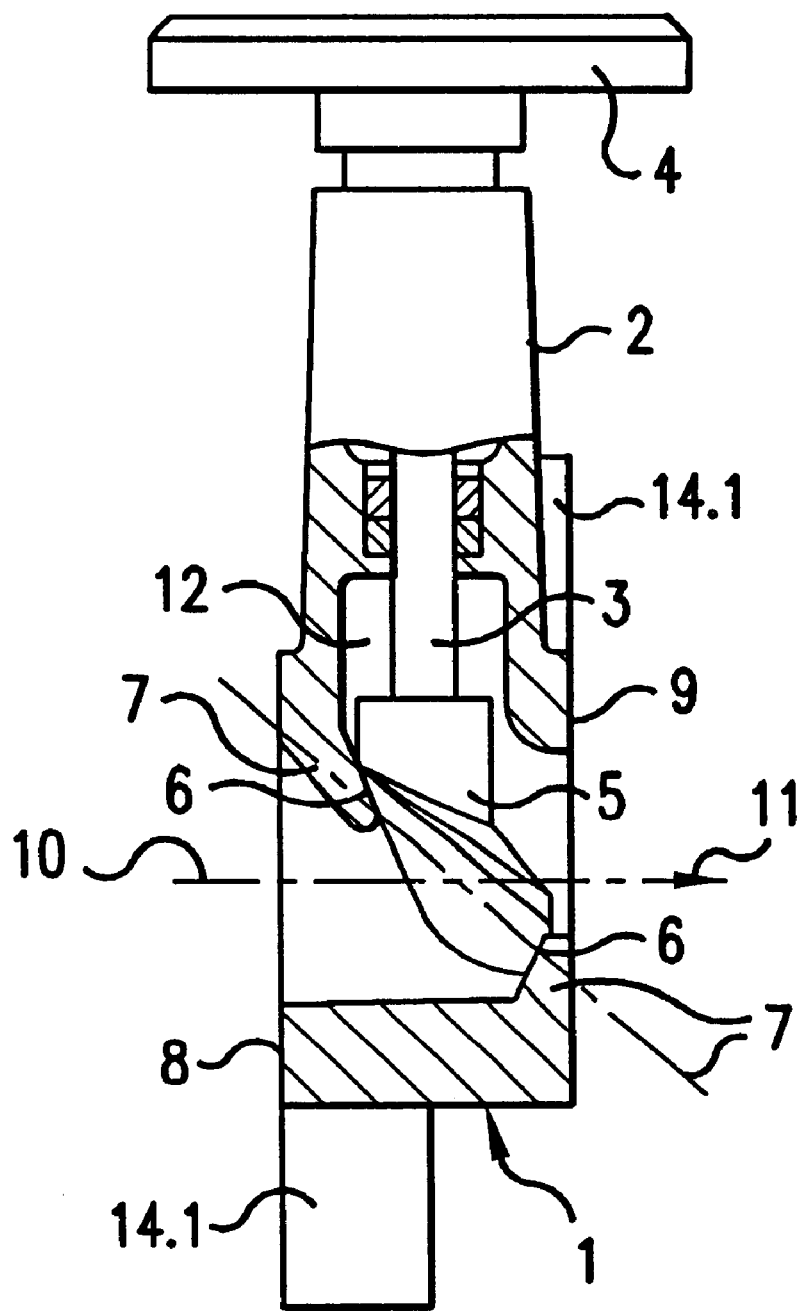
FIGS. 1–3 show various nominal diameters of a lift valve.
Figure 2:
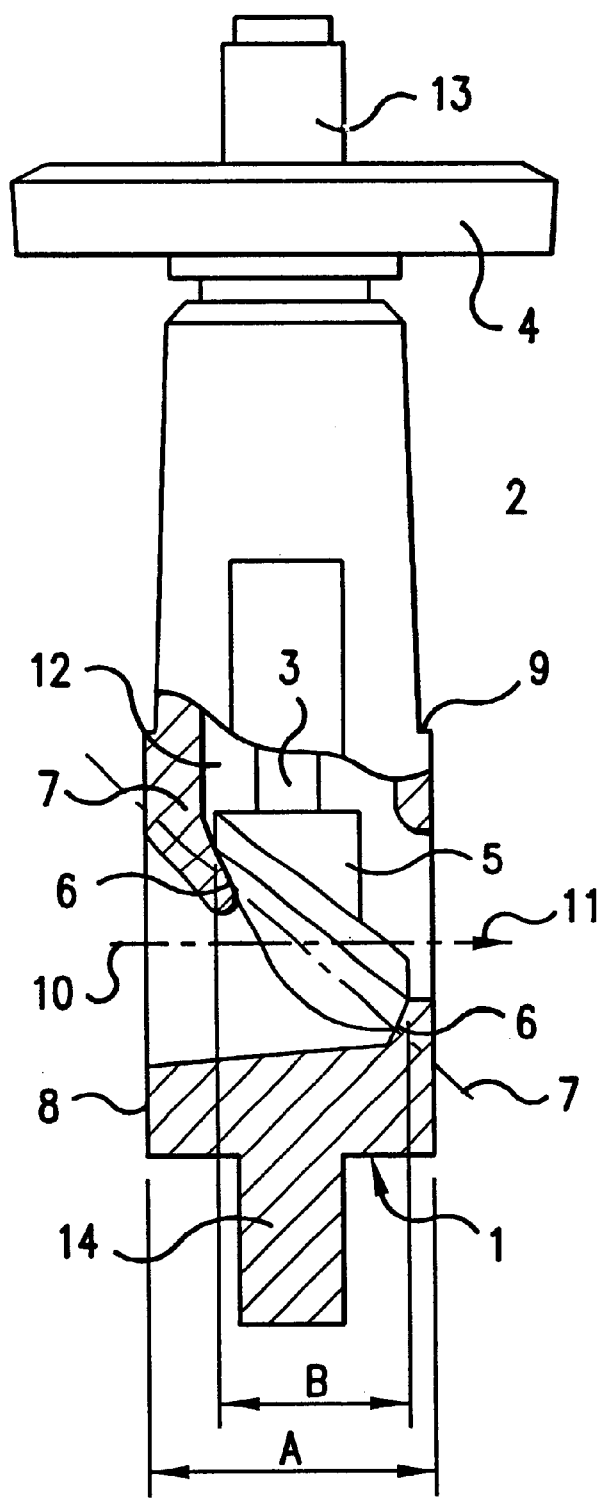
Figure 3:
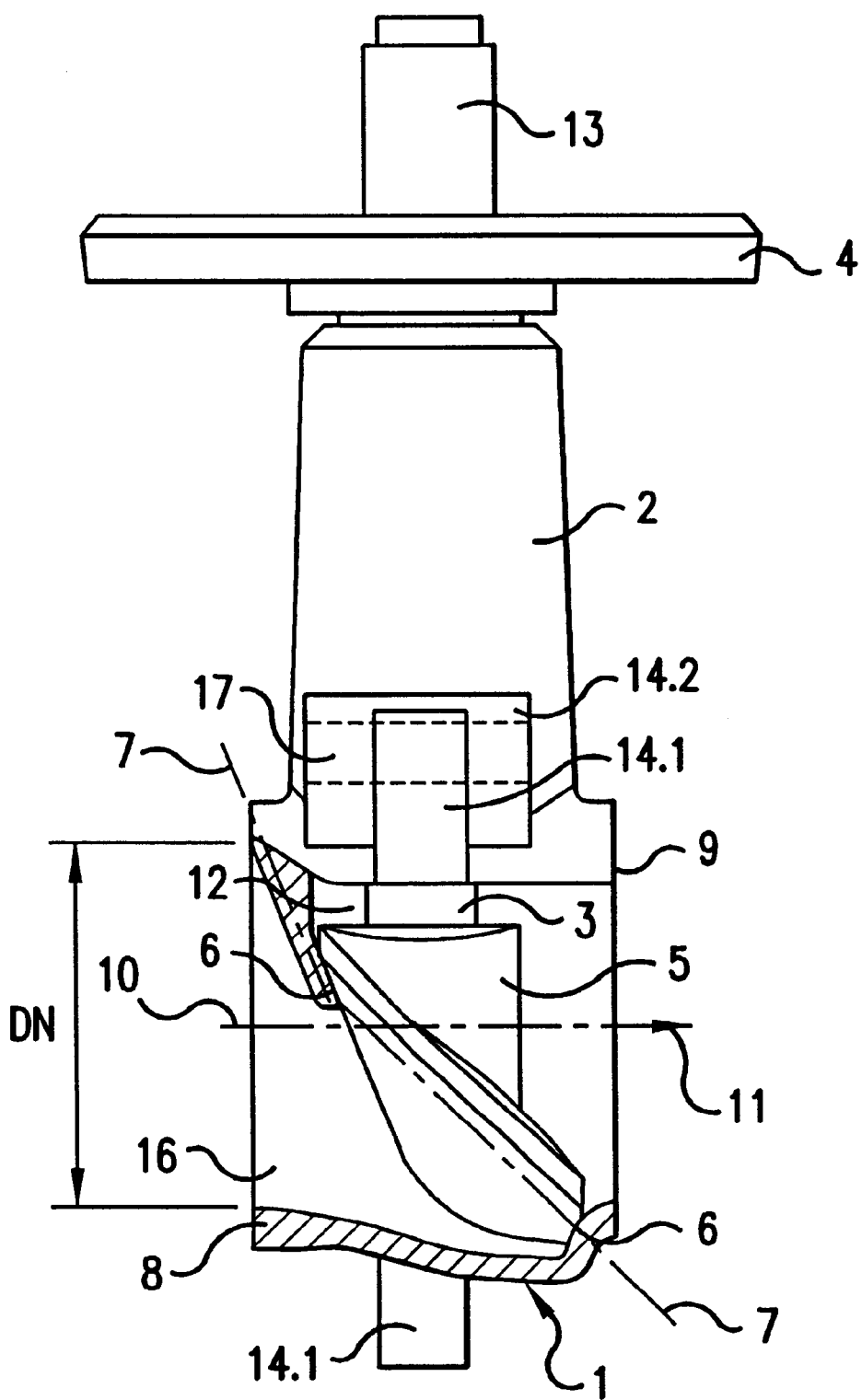

FIGS. 1–3 illustrate the lift valve with three different nominal diameters. FIG. 1 corresponds here to a lift valve for a small nominal-diameter range around DN 25, FIG. 2 corresponds to a nominal diameter in the region around DN 50 and FIG. 3 corresponds to a nominal diameter in the region around DN 100. The illustrations are partially in section, the seat region being shown in section in each case. In FIG. 1, the casing 1 has a casing neck 2 in which a rising valve stem 3 is arranged and can be activated by means of a handwheel 4. The valve stem is connected to a closure element 5. The connection between the valve stem 3 and closure element 5 and their movement take place in a known manner. In the illustration, the closure element is pressed in a sealing fashion into a valve seat 6 which is a component of a dividing face 7. The central region of the dividing face 7 is illustrated as a dot-dash line and can be considered to be a plane perpendicular to the plane of the drawing. The dividing face 7 starts directly or indirectly from the end faces 8, 9 of the casing and can be regarded as a connecting surface between the end faces 8, 9 of the casing. The dividing face 7 extends obliquely with respect to the pipeline axis 10 and intersects it. The preferred through-flow direction is marked here with the arrow 11. The flow through the lift valve can also be counter to the preferred direction. By activating the handwheel, the closure element 5 is lifted out of the valve seat 6 and migrates, as a result of a rising stem 3 used here, into a space 12 which is located above the valve seat 6.

By virtue of the fact that a dividing wall which is equipped with a valve seat is designed as an oblique surface connecting the end faces of the casing, it is possible to reduce the overall length of a lift valve drastically. The lift valve can thus be clamped in directly between the flanges of a pipeline to be connected, and—as is shown in more detail in the following figures—can be held between them. The dividing wall here can have a planar or spatially curved course.

FIG. 2 corresponds in design to the illustration in FIG. 1, a protective cap 13, which constitutes an enclosure for the rising stem 3, being mounted on the handwheel 4. Said stem 3 can at the same time serve to display the lift position, in that, for example, openings are provided which allow the lift position of the stem to be seen. The casing 1 shows here a receptacle 14 which protrudes radially outwards, is of annular design, and serves to guide screw elements 15 (illustrated in FIG. 12). When the valve is used as a termination valve on a pipeline, the screw elements 15 can also abut directly against the receptacle 14. In contrast to FIG. 2, a plurality of receptacles 14.1 which protrude radially from the casing 1 are used in FIG. 1, said receptacles 14.1 being arranged offset with respect to the axis of the stem 3. This measure makes it possible to arrange some of the screw heads or nuts in the region within the overall length, in order to permit the valve to be used as a termination valve for both directions of through-flow. The amount A entered in FIG. 2 corresponds here to the overall length of the lift valve and/or the distance between the casing end faces 8 and 9 which define the overall length. The measure B corresponds to the length of the closure element 5 projected onto the pipeline axis 10. In the embodiment shown here, the overall length A of the lift valve is only slightly greater than the projected length B. This is the result of the necessary wall thickness, a symmetrical arrangement of the valve stem 3 with respect to the overall length A and the junctions between the dividing face 7, having the valve seat 6, and the casing wall. With a non-symmetrical arrangement, the overall length could be made correspondingly shorter.

The illustration in FIG. 3 shows a lift valve for a nominal-diameter range around and greater than DN 100. DN designates the nominal diameter of the lift valve which corresponds approximately to the diameter of a connecting pipeline to which a lift valve is connected. In the exemplary embodiment shown here, the dividing face 7 has a spatially curved course as a result of a bend. In the region of relatively large nominal diameters, this measure provides the advantage that the valve seat 6 is displaced almost completely into a region which is located below the pipeline axis in a region of the flow space 16 of the casing 1 which is remote from the valve stem 3. This has the decisive advantage that the space 12 which receives the closure element 5 during a travel movement is also displaced towards the pipeline axis 10. In this way, it is ensured that the flow space 16 and the space 12 is [sic] located within the region which is enclosed by those screw elements which clamp in the lift valve, together with the necessary casing wall. The number of screw elements is dependent on the admissible pressure load and the overall size or the nominal diameter of the lift valve. Usually more than four connecting elements are used. Arranged on the casing 1 are centrally arranged receptacles 14.1 in which there are openings 17 for receiving screw elements (not illustrated here). In the junction between the casing neck 2 and the casing 1 there are receptacles 14.2 which are designed as a thickened portion of material. In said receptacles 14.2 there are in the case of relatively large nominal diameters, for example, through-holes and/or threaded holes if, owing to the prescribed dimensions of the pipeline flanges and the size of the casing neck 2, it is not possible to attach a screw element directly to the side of the casing neck 2. When the valve is used as a termination valve, the thickened portions 14.2 act as bearing faces for screw elements.

Figure 4:
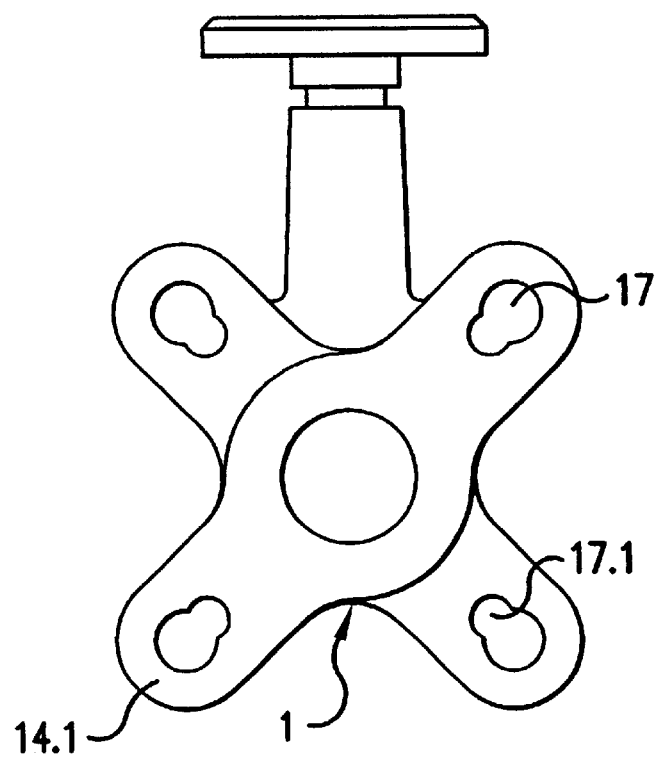
FIGS. 4 & 5 show two further views of FIG. 1.
Figure 5:
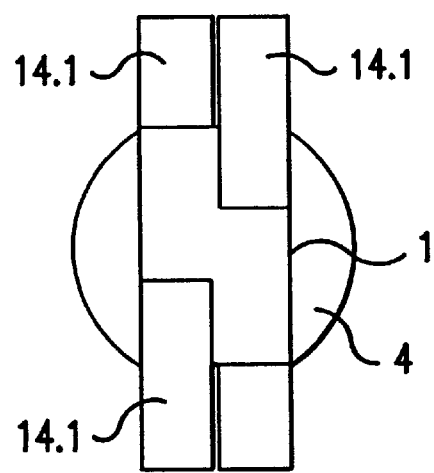

FIGS. 4 and 5 show two further views of FIG. 1. FIG. 4 is a side view from which it is clear that the casing 1 is equipped with four radially protruding receptacles 14.1 which may serve as supporting surfaces for screw elements. The screw elements are guided in openings 17 and 17.1 of the receptacles 14.1. The openings 17 and 17.1, which are continuous with one another here, correspond to the hole pattern of flanges which are to be connected and which have different pressure loads and/or are of different standards. As a result, a lift valve can be used in various fields of technology. The number of special designs can thus be considerably reduced. This type of receptacles 14.1 shown here is used preferably at small nominal diameters in a pressure range which is prescribed for flanges which must withstand a nominal pressure of PN 6 and PN 10/16. It is clear from FIG. 5, a view of the underside of the lift valve, that the receptacles 14.1 are arranged laterally offset with respect to the stem axis. This makes it possible to accommodate screw heads and nuts in the region of the overall length of this lift valve for both directions of flow when it is used as a termination valve.

Figure 6:
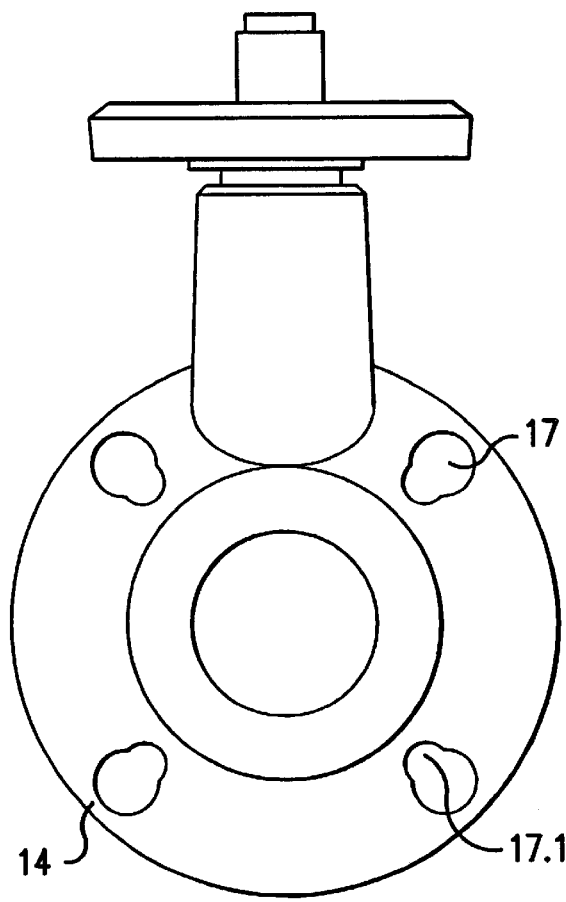
FIGS. 6 & 7 show two further views of FIG. 2.
Figure 7:
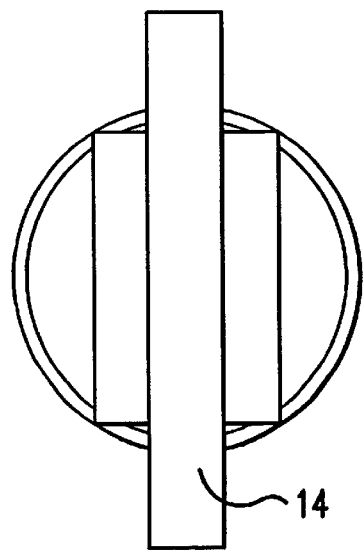

FIGS. 6 and 7 show two further views of FIG. 2, which shows a lift valve of medium overall size from a nominal diameter range around DN 50. The receptacle 14 is mounted centrally on the casing 1 here and also has screw-element openings 17 and 17.1 which are continuous with one another. The receptacle 14 serves as a supporting face for screw elements 15 when this lift valve is used as a termination valve on a pipeline. If the lift valve is clamped in between two flanges, screw elements, which press the flanges against the lift valve in a sealing fashion, are pushed through the openings 17 or 17.1.

Figure 8:
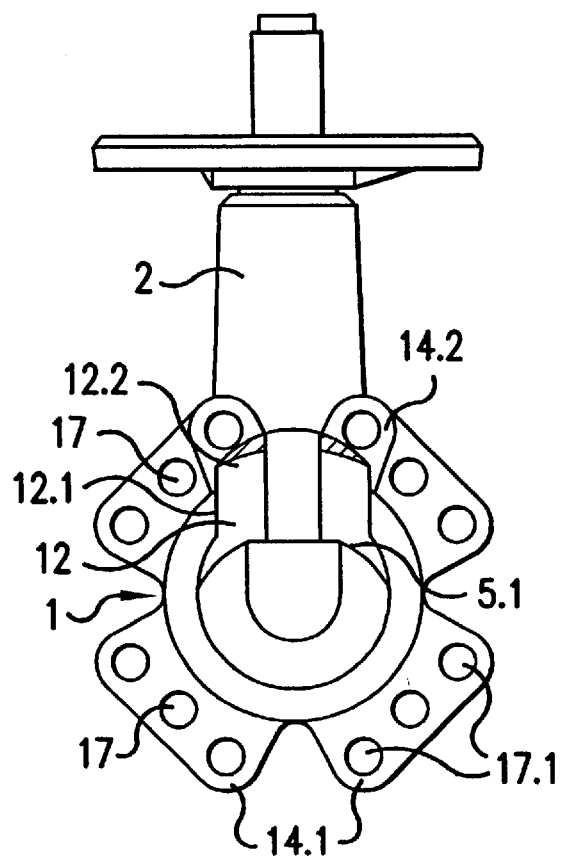
FIGS. 8 & 9 show two further views of FIG. 3.
Figure 9:
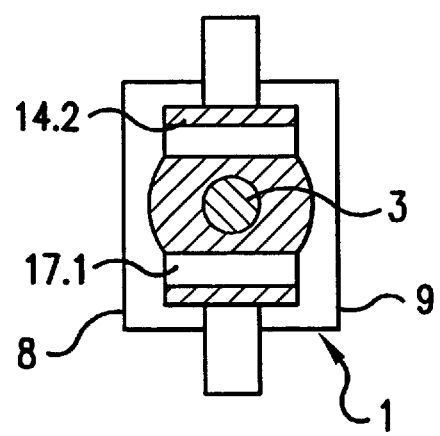

FIG. 8 shows a side view and FIG. 9 shows a section along the line IX—IX of FIG. 3 on this page. The receptacles 14.1 are of a size which permits a plurality of openings 17 and 17.1 to be arranged. The central openings 17 of a receptacle 14.1 which are entered in FIG. 8 correspond to those flange designs which are used for a pressure range of PN 6. The openings 17.1 of a receptacle 14.1 which are external hereto exhibit a hole arrangement such as is used for flanges in the rated pressure range of PN 16. At the junction to the casing neck 2, thickened portions 14.2 of material are provided, in which, for example, pure through-openings, threaded blind holes, threaded holes or the like can be arranged. As a result, when the valve is used as a termination valve of a length of pipeline, it is also possible to provide a bearing face for mounting elements.

FIG. 8 also shows a partial section with a sectional line 12.1, which makes it possible to see into the space 12. This section shows that the wall 12.2 bounding the space 12 opposite the casing neck 2 has an arcuate or spatially curved course. In a corresponding way, the face 5.1 lying opposite the wall 12.2 on the closure element 5 is of curved design. When the lift valve has been completely opened, the face 5.1 and the wall 12.2 abut against one another. This feature makes it possible, in the case of relatively large nominal diameters, for the closure element 5 and the associated space 12 to be located completely within a pitch circle which is defined by the openings 17 and 17.1 and by the thickness of the casing wall. As a result, even in the case of large nominal diameters of a lift valve, it is possible to obtain a short overall length with a simultaneously advantageous coefficient of flow resistance $\xi$. The face 5.1 and the wall 12.2 which corresponds to it can also have a differently curved course than that shown in FIG. 8.

FIG. 9, which corresponds to a section through the casing neck 2 of FIG. 3 shown here, also shows the thickened portions 14.2 of material with the openings 17.1 which are arranged at the junction with the casing neck 2.

Figure 10:
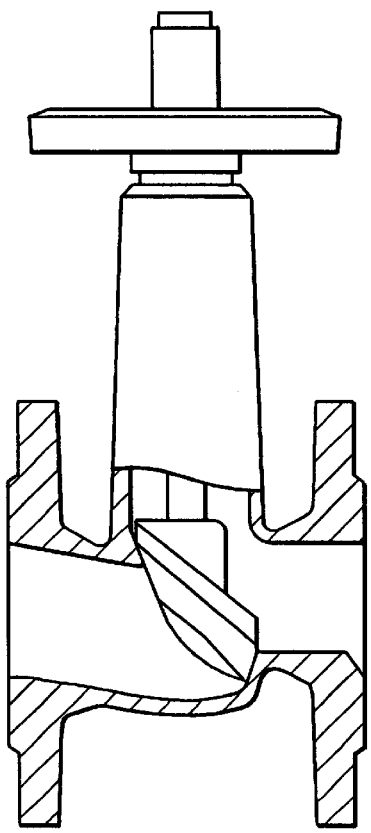
FIGS. 10 & 11 show a comparison of FIG. 2 with the prior art.
Figure 11:
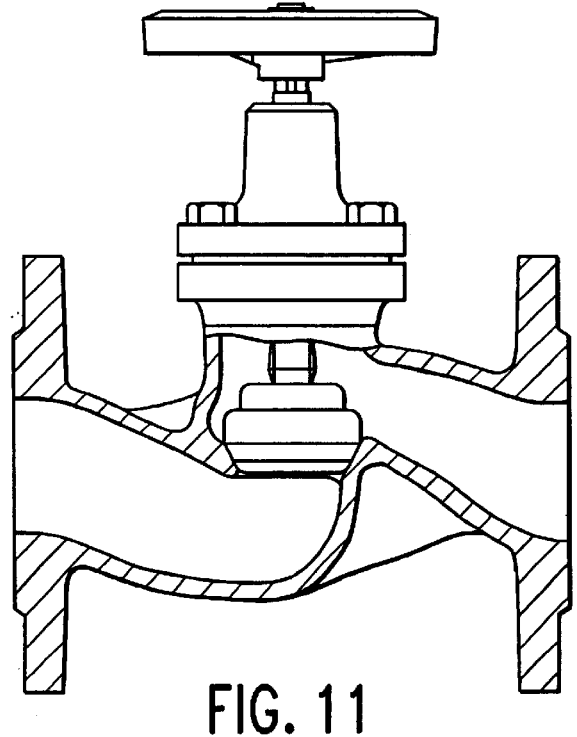

The lift valves shown in FIGS. 10 and 11 are shown in a position opposite to that in the solution according to FIG. 2. The nominal diameters are identical. Said figures indicate how the overall length of a lift valve can be significantly reduced with the aid of the design according to the invention. FIG. 10 shows our design of the BOA-Compact KSB lift valve, while FIG. 11 shows an overall length of a traditional lift valve. The new design of FIG. 2 permits significant savings in material, and at the same time the mounting, transportation and stock holding are thus substantially simplified. Furthermore, savings in terms of the pipeline lengths result for the user of such a lift valve and, as a consequence of this, less space is required for a pipeline system.

Figure 12:
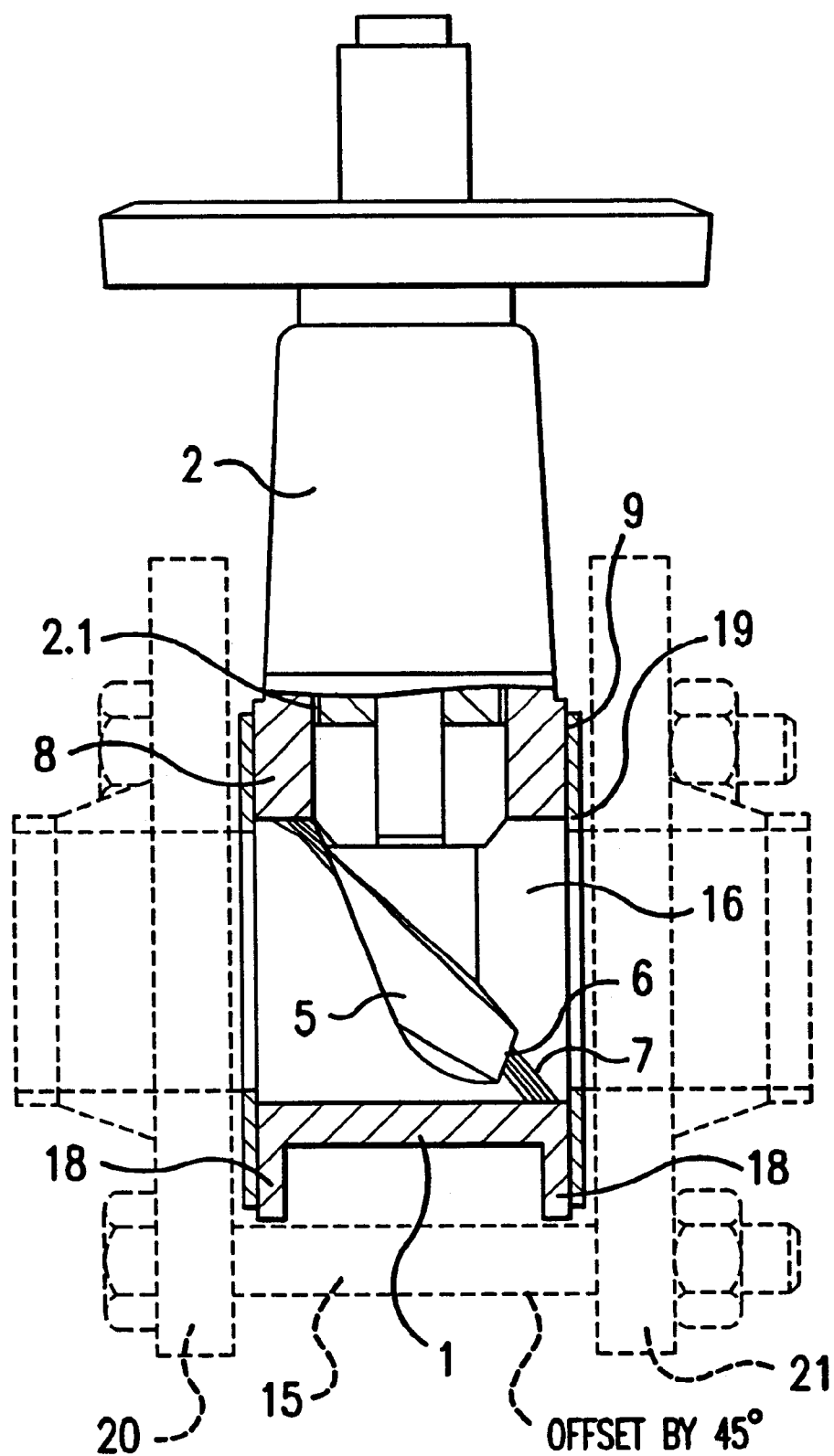
FIG. 12 shows a lift valve with separately produced valve seat.

FIG. 12 shows a design in which the casing 1 is of annular design and has a cylindrical flow space 16. The dividing face 7, which is equipped with the valve seat 6, is designed as a separate component here and is mounted in the casing 1 in a sealing fashion. This can be effected by means of the customary measures, a welded connection being shown in the exemplary embodiment. For reasons of saving material, the end faces 8, 9 of the casing have annular faces 18, a number of which project radially. This serves to form a sufficiently wide sealing face for those cases in which the lift valve is clamped in between the flanges 20, 21 (illustrated by dashed lines) of a pipeline accompanied by the intermediate positioning of flat seals 19. Furthermore, mounting is made easier if the annular faces 18 can rest on the screw elements 15, which are shown here offset by 45° and illustrated by means of broken lines. In order to mount the valve, lower screw elements 15 are firstly pushed in in order to serve as supports for the lift valve which is inserted between the flanges 20, 21 of a pipeline which is to be connected. The casing 1 has here a casing neck 2 which is designed as a separate component. This permits the closure element 5 to be mounted and, if appropriate, also makes it possible to work on the valve seat 6 through an opening 2.1.

Figure 13:
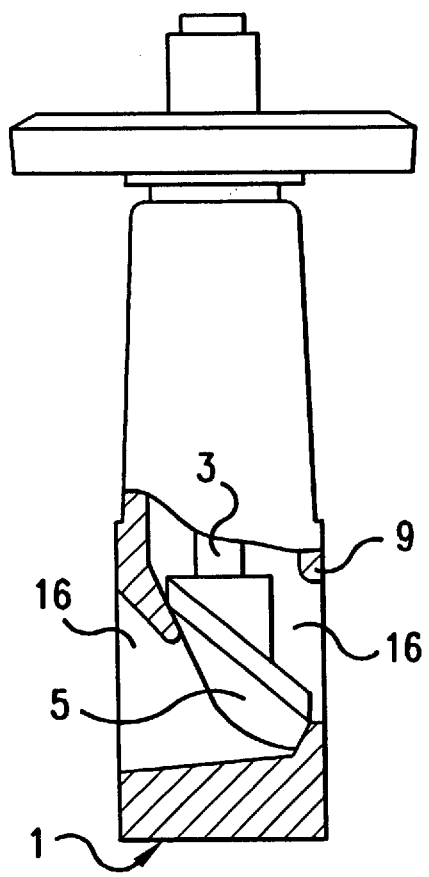
FIGS. 13 & 14 show two views of the lift valve with an annular casing.

FIG. 13 also shows an annular design of a casing 1 with the difference with respect to FIG. 12 that here the casing is designed completely as a single-component cast casing. For mounting, the closure element 5 is guided in this case from the end face 9 of the casing into the flow space 16 and connected therein to the valve stem 3.

Figure 14:
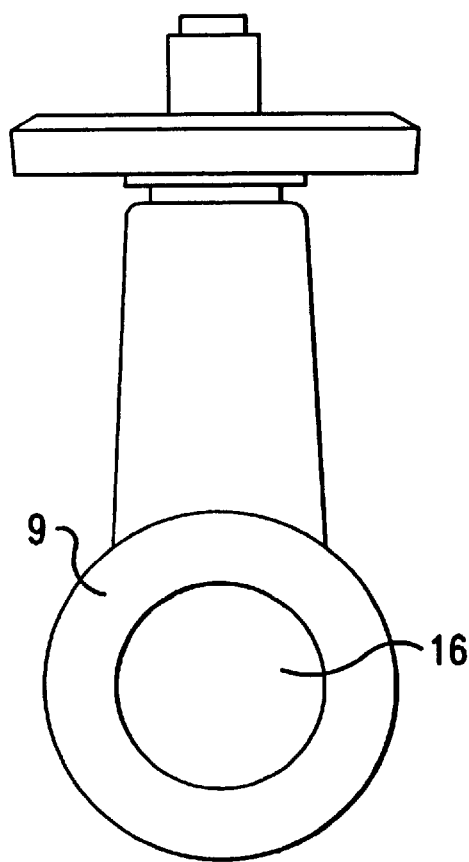

As is shown by FIG. 14, there are no receptacles attached to the outside of the casing 1, so that this lift valve is mounted in such a way that it is clamped in exclusively between flanges.

Figure 15:
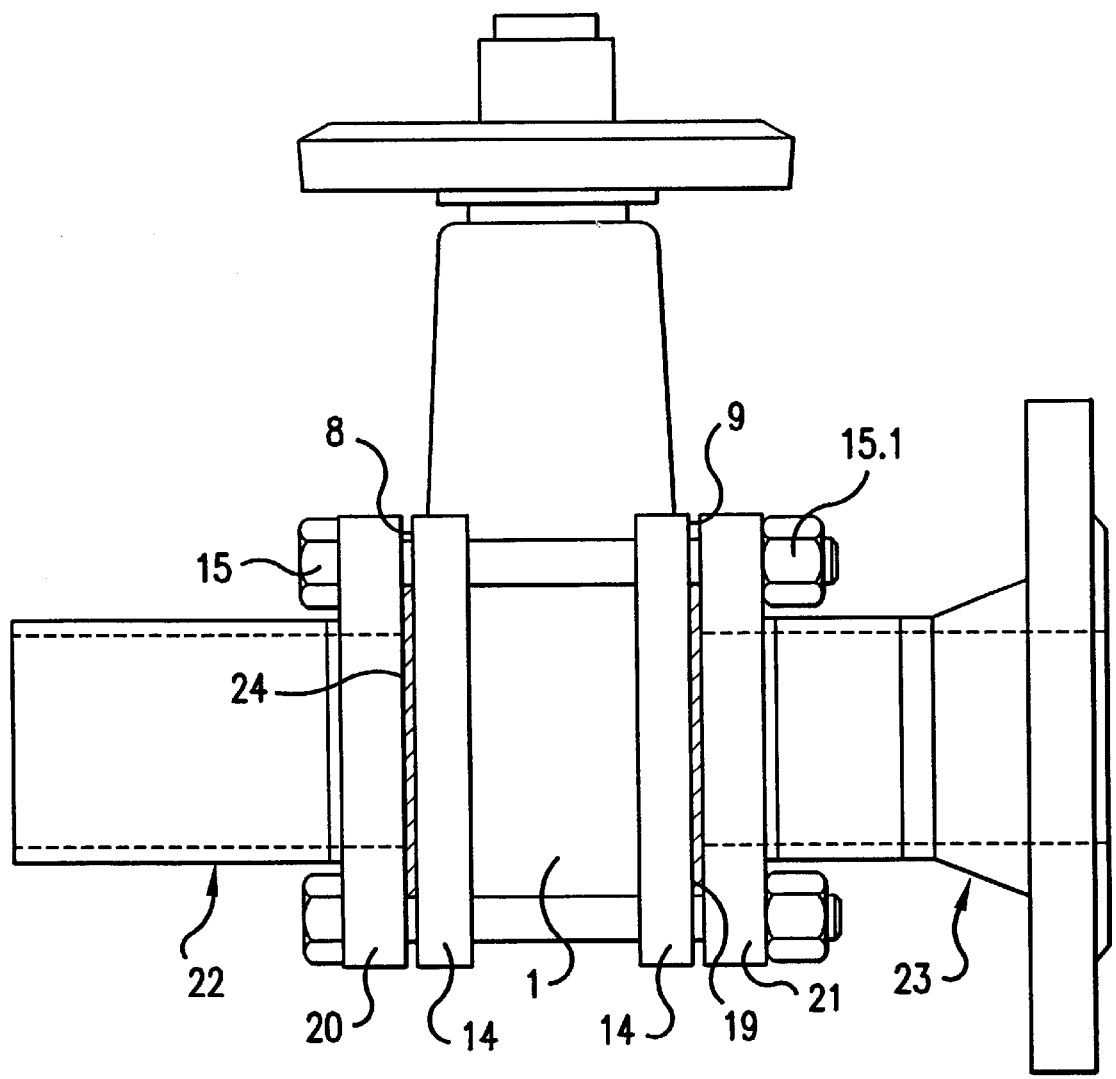
FIG. 15 shows a lift valve with various connection adapters.

FIG. 15 shows the connection of the lift valve to two different connection adapters 22, 23. The left-hand connection adapter 22 is composed of a connection flange 20 which is provided with a welding connector. When a connection adapter 22 which can be welded into a pipeline system is used, a thermal barrier 24 is used. In the example illustrated, it also fulfils at the same time the function of a seal. The latter is then mounted between the end face 8 of the casing and the flange 20 of the connection adapter 22. This produces a further advantage for mounting. The lift valve is supplied to the building site with the connection adapter 22 premounted. By virtue of the thermal barrier which has likewise been premounted, the lift valve can be welded directly into a pipeline. It is not necessary to disconnect the lift valve and connection adapter for the duration of the welding process. The thermal barrier prevents the valve being heated to an unacceptable degree and permits more rapid mounting. Since, in this exemplary embodiment, the screw elements 15, 15.1 are arranged at a distance from the lift valve 1 and do not have a direct connection to the receptacle 14, it is possible to dispense with a thermal barrier between the screw element 15 and flange 20.

The right-hand half of FIG. 15 shows the connection of the lift valve 1 to a connection adapter 23, which adapter permits connection to a flange of a pipeline. Between the end face 9 and the flange 21 of the connection adapter 23 there is a customary flange seal 19. The flanges 20, 21 of the connection adapters in use here are held together by screw elements 15, 15.1 which act as tie rods.

Figure 16:
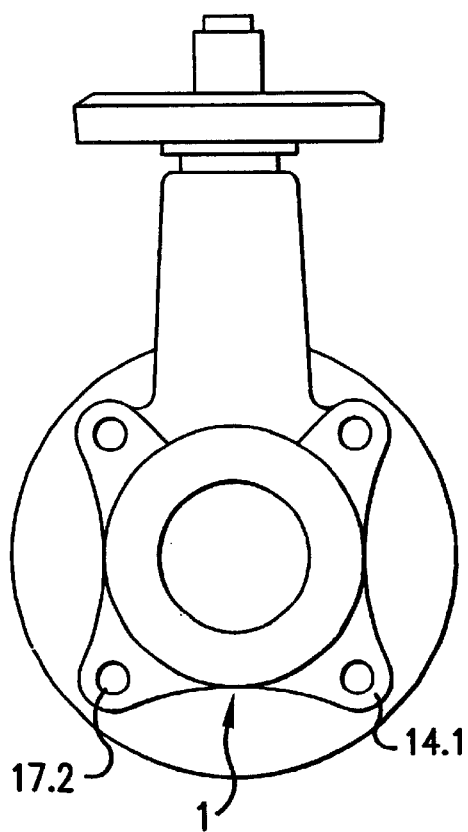
FIGS. 16 & 17 show two views of a lift valve with a plurality of receptacles.
Figure 17:
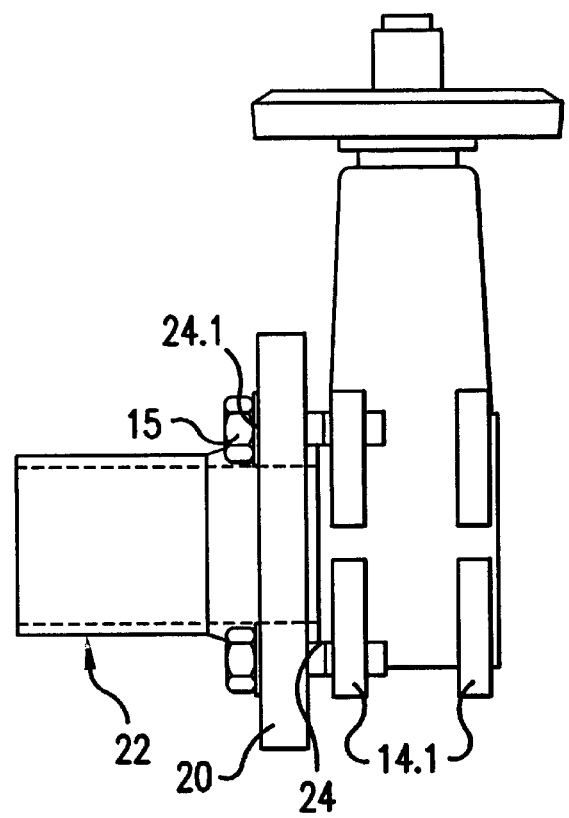

FIGS. 16 and 17 show a lift valve 1 which is equipped on its outer side with a plurality of receptacles 4.1 arranged in two planes. Threaded holes 17.2, into which screw elements of a connection flange can be screwed, are arranged in the receptacles 14.1. FIG. 17, a side view of FIG. 16, is provided with a screwed-on connection adapter 22 with a welding connector. Since the connection adapter 22 is connected here to the receptacles 14.1 of the casing by means of screw elements 15, additional thermal barriers 24.1 are arranged between the flange 20 and screw element 15.

The page with the FIGS. 18 to 25 shows, in the form of an overview, combination possibilities of the lift valve with various connection adapters. Such methods of installing valves are used, for example, when existing installations are to be re-equipped. The adapters also permit valves to be installed in pipeline systems with different connection systems. The connection adapters can be premounted on the lift valve even before they are delivered to a mounting point. Such premounting of the connection adapters which can be easily manufactured can be done cost-effectively on the premises of the manufacturer, dealer or installation manufacturer. In this way, the expensive mounting time at a building site can be reduced.

Figure 18:
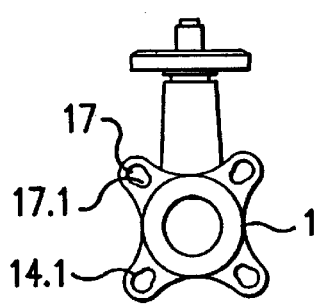
FIGS. 18–25 show different variants of the lift valve.

FIG. 18 shows a side view with a plurality of receptacles 14.1 which have various openings 17, 17.1. The admissible pressure load of the casing 1 is designed in each case for a relatively high pressure range, so that the lift valve can be used in low pressure ranges without difficulty. Designing the casing for the pressure range PN 16 thus permits it to be used in pressure ranges PN 16, 10 and 6. In accordance with this, the flange openings are also on different pitch circles, which can be compensated for with the different openings 17, 17.1 of the lift valve.

Figure 19:
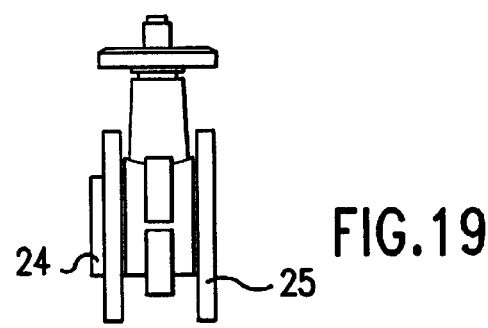

FIG. 19 shows, as an example, the connection of the lift valve 1 to a connection adapter 24, which is arranged on the left-hand side and is designed as a threaded flange. This makes it possible to screw a threaded flange onto a pipeline end which is equipped with an external thread, and thus to design this pipeline in such a way that it can be connected to the lift valve. On the right-hand side of FIG. 19, the lift valve is closed off by a blind flange. Such a design is used in pipeline systems which are equipped with expansions and adapted to changed conditions only at a later time. By removing the blind flange 25, the pipeline system can then be expanded further downstream of the lift valve.

Figure 20:
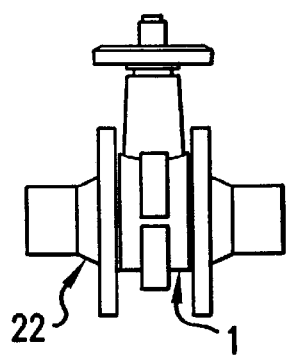
Figure 21:
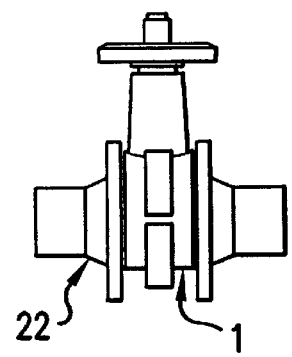

FIG. 20 shows the connection of the lift valve 1 with connection adapters 22 which are designed as welding connectors. Thermal barriers are again arranged between the connection adapter 22 and casing 1. The casing adapters 22 shown here are configured for a rated pressure range 16, while the same design of connection adapters in the embodiment for the rated pressure range PN 6 is shown in FIG. 21 next to it.

Figure 22:
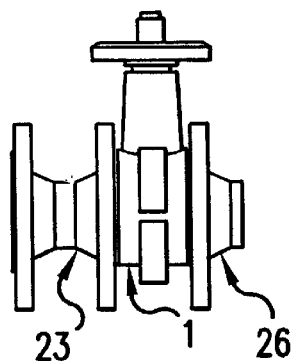
Figure 23:
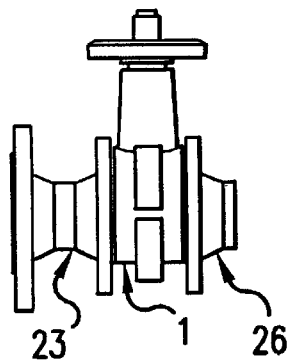
Figure 24:
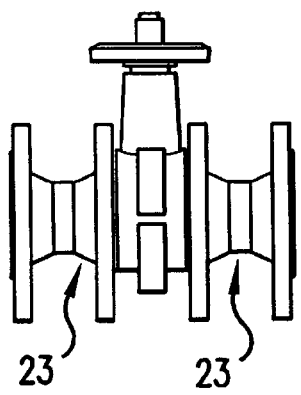
Figure 25:
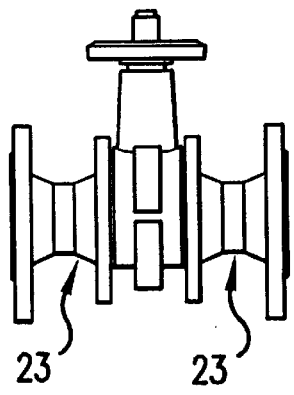

FIG. 22 illustrates the installation of the lift valve into a pipeline system of the rated pressure range PN 16. On the left-hand side of the lift valve 1 there is a flange adapter 23, which permits connection to a pipeline system equipped with flange ends. On the right-hand side of the lift valve there is a connection adapter 26 in the form of a so-called welding neck flange. Here, the pipeline is welded directly onto the welding neck flange. For safety reasons, a thermal barrier is provided between lift valve 1 and connection adapter 26. The embodiment shown in FIG. 23 corresponds essentially to FIG. 22 with the difference that here the lift valve 1 is shown as an equalization point between two pipeline systems with different pressure loads. The connection adapter 23 which is arranged on the left-hand side is used for connecting to a pipeline system with the higher pressure load PN 16, while the right-hand side connection adapter 26 is equipped as a connecting element for a pipeline system with a lower pressure load of PN 6. FIGS. 24 and 25 are configured appropriately. However, the difference here is that the connection adapters 23 used are designed as flange adapters. The design according to FIG. 24 is for use in pipeline systems with PN 16, while the design of FIG. 25 shows a connection between two pipeline systems, the left-hand side system being configured for PN 16 and the right-hand side system being configured for PN 6.

These illustrations indicate that with only a single lift valve the range of application and use of such a lift valve can be increased in a significant and decisive way. This measure constitutes an advantageous possibility of use for all those involved.

Figure 26:
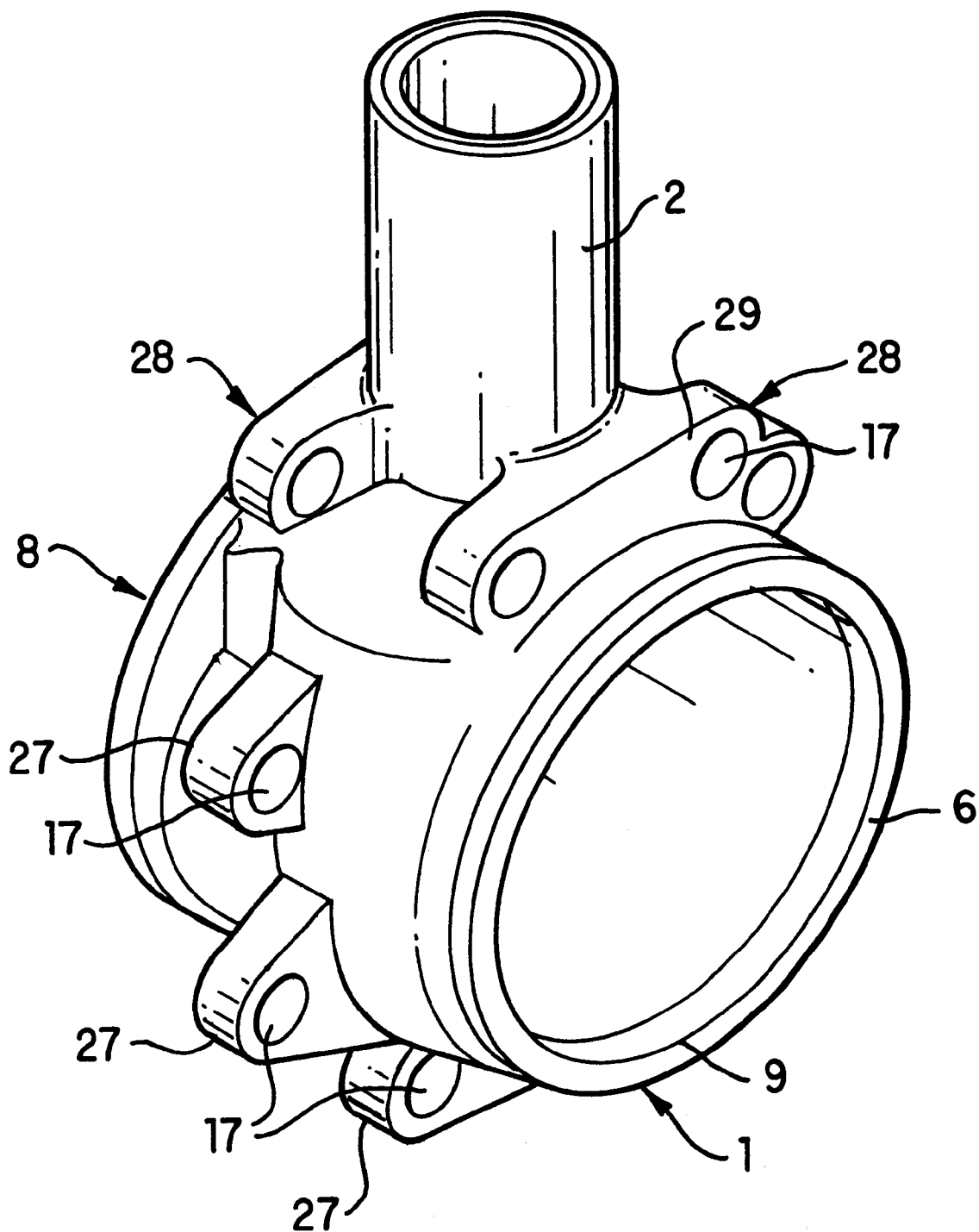
FIG. 26 shows a perspective view of the casing.

FIG. 26 shows a casing 1 of a lift valve which is used for relatively large nominal diameters, these being DN=or >80 nominal diameters. In the case of such relatively large nominal diameters, pipeline flanges are used which are connected using more than four screw elements. For this reason, a lift valve which is connected to such a pipeline must have a corresponding number of receptacles or flange components 27 in which openings 17 for screw elements (not illustrated here) are used. FIG. 26 shows a casing which is optimized in terms of weight and in which the flange components 27 are not connected to one another. If the flange components 27 were connected to one another materially, they would then constitute a so-called monoflange. Two flange components 28 are used in the region of the casing neck, the casing neck 2 and the openings 17 which are located in the flange components 28 having a shape which permits screw elements to be pushed through. The openings 17 are arranged here on a circle which, in accordance with the respectively used standard, corresponds to a pipeline flange which has the same nominal diameter. Opposite the end face 8 and 9 of the casing, the flange components 28 are arranged offset towards the centre of the casing. This offset, which is in the axial direction, results in a shoulder between the bearing face 29 of the flange component 28 and the end face 9 of the casing which is of such a size that a screw head or a nut of a mounting means bearing against it, as well as washers or securing elements which may be necessary, have an axial extent which does not protrude beyond the end faces 8, 9 of the casing.

Figure 27:
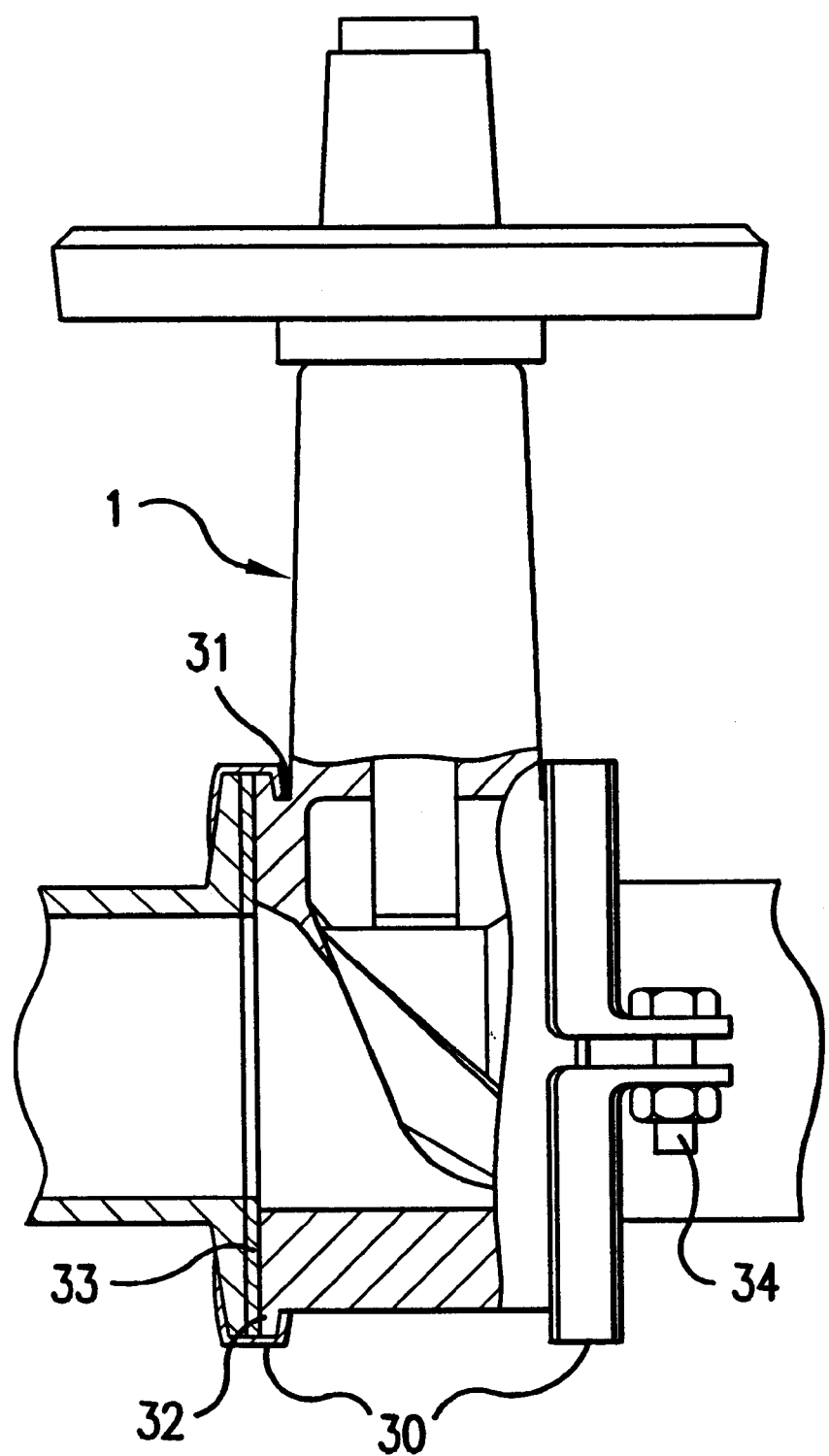
FIG. 27 shows a way of mounting the lift valve using clamps.

FIG. 27 shows a way of mounting the casing 1 of the lift valve on a pipeline of the like using clamps 30. The clamps may be designed as individual elements or as elements which are connected to one another. The clamps 30 interact with the casing 1 by means of grooves 31 or projections 32 provided thereon. The clamp shape which is used causes the lift valve to be pressed in a sealing fashion against a seal 33 and/or against a component of the installation. Tensioning elements 34 produce in the clamps 30 the forces which are necessary for cohesion.

What is claimed is:

1. A lift valve having a nominal diameter size and comprising a casing having end-face surfaces arranged parallel to one another for sealing abutment against sealing faces of pipelines or abutting components; a valve stem arranged in a casing neck perpendicular to a pipeline axis; and a closure element which is connected to the valve stem and interacts with a valve seat in said casing; wherein the end-face surfaces of the casing each are formed on a region of the casing which surrounds the closure element; the valve seat is oriented obliquely with respect to the valve stem, and the valve seat is arranged as a connecting oblique element in the region between the end-face surfaces of the casing; the end-face surfaces of the casing being spaced apart a distance which is greater than a length of the closure element projected onto the pipeline axis, and said lift valve having a casing wall thickness, valve seat length, and junction size between the valve seat and the casing which are configured to provide said lift valve with an overall length equal to the distance between the casing end-face surfaces and not greater than the nominal diameter of the lift valve size.

2. A lift valve according to claim 1, wherein the distance between the end faces of the casing is less than or equal to the nominal diameter of the lift valve size.

3. A lift valve according to claim 1, wherein said casing has an annular configuration.

4. A lift valve according to claim 1, wherein the casing and the casing neck are constructed as a single unitary component.

5. A lift valve according to claim 1, wherein the casing and the casing neck are constructed of multiple parts.

6. A lift valve according to claim 1, wherein said casing comprises a wall which limits travel of the closure element; said wall being designed so as to be concave towards a space in which the closure element moves.

7. A lift valve according to claim 6, wherein the closure element has a convex face which abuts said concave wall when the closure element reaches the limit of its travel.

8. A lift valve according to claim 1, wherein said lift valve is a wafer-type lift valve.

9. A lift valve according to claim 1, wherein said casing is a mono-flange casing.

10. A lift valve according to claim 1, wherein said valve comprises at least portions of flanges arranged between the end faces of the casing, and portions of the flanges are arranged in a plane which intersects the valve seat.

11. A lift valve according to claim 1, wherein said valve comprises flanges or flange portions arranged set back with respect to the end faces of the casing by an amount which corresponds to the height of a screw head or of a nut.

12. A lift valve according to claim 1, further comprising clamps for connecting the valve casing to a pipeline.

13. A lift valve according to claim 12, wherein said casing is provided with grooves or projections arranged on the periphery of the casing in the vicinity of the casing end faces to provide supporting surfaces for said clamps.

14. A lift valve according to claim 1, wherein the end faces of the casing are designed as interfaces for connection to connection adapters for pipelines.

15. A lift valve according to claim 14, wherein said connection adapters are provided on the pipeline side with different connection shapes.

16. A lift valve according to claim 14, further comprising at least one thermal barrier arranged between the lift valve and connection adapter.

17. A lift valve according to claim 1, wherein the region of the casing which surrounds the closure element is provided between the casing end faces with at least one radially extending receptacle in which openings for screw elements are arranged.

18. A lift valve according to claim 1, wherein the casing neck which receives the valve stem is provided with receptacles for screw elements.

19. A lift valve according to claim 18, wherein the casing neck through which the valve stem extends is provided with thickened portions of material in which screw receptacles are arranged.

20. A lift valve according to claim 1, wherein said valve is installed in a pipeline with the valve seat of said valve arranged in a location between the pipeline axis and a flow space in the casing which is remote from the valve stem.

* * * * *

UNITED STATES PATENT AND TRADEMARK OFFICE
CERTIFICATE OF CORRECTION

PATENT NO. : 6,293,518 B1
DATED : September 25, 2001
INVENTOR(S) : Alois Illy et al.

It is certified that error appears in the above-identified patent and that said Letters Patent is hereby corrected as shown below:

<u>Title page,</u>
Item [73], change the Assignee data from "RSB Aktiengesellschaft, Riankenthal (DE)" to -- KSB Aktiengesellschaft, Frankenthal (DE) --.

Signed and Sealed this

Fifth Day of March, 2002

Attest:

JAMES E. ROGAN
*Attesting Officer*   *Director of the United States Patent and Trademark Office*